United States Patent
Schank

(10) Patent No.: US 9,809,303 B2
(45) Date of Patent: Nov. 7, 2017

(54) ROTOR POSITION DETERMINATION SYSTEM WITH MAGNETO-RESISTIVE SENSORS

(71) Applicant: Bell Helicopter Textron Inc., Fort Worth, TX (US)

(72) Inventor: Troy C. Schank, Keller, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 24 days.

(21) Appl. No.: 14/481,074

(22) Filed: Sep. 9, 2014

(65) Prior Publication Data

US 2015/0069175 A1 Mar. 12, 2015

Related U.S. Application Data

(63) Continuation-in-part of application No. 13/601,077, filed on Aug. 31, 2012, now Pat. No. 8,955,792.

(51) Int. Cl.
| | |
|---|---|
| *B64C 11/00* | (2006.01) |
| *B64C 27/54* | (2006.01) |
| *B64C 27/00* | (2006.01) |
| *G01B 7/00* | (2006.01) |
| *B64C 27/35* | (2006.01) |
| *G01D 5/14* | (2006.01) |

(52) U.S. Cl.
CPC ............ *B64C 27/008* (2013.01); *B64C 27/35* (2013.01); *G01B 7/003* (2013.01); *G01D 5/145* (2013.01)

(58) Field of Classification Search
CPC ..... B64C 27/008; B64C 27/35; B64C 27/605; B64C 27/51
See application file for complete search history.

(56) References Cited

U.S. PATENT DOCUMENTS

| | | | |
|---|---|---|---|
| 4,583,862 A | 4/1986 | Ferrar et al. | |
| 4,648,345 A | 3/1987 | Wham et al. | |
| 5,011,373 A | 4/1991 | Aubry et al. | |
| 5,749,540 A | 5/1998 | Arlton | |
| 7,059,822 B2 * | 6/2006 | LeMieux | F03D 17/00 415/118 |
| 7,448,854 B2 * | 11/2008 | Jolly | B64C 27/001 415/119 |
| 8,070,090 B2 | 12/2011 | Tayman | |
| 8,773,124 B2 * | 7/2014 | Ausserlechner | G01D 5/145 324/173 |
| 2009/0236468 A1 | 9/2009 | Welsh | |

(Continued)

FOREIGN PATENT DOCUMENTS

DE 4329521 A1 3/1995

OTHER PUBLICATIONS

European Search Report in related European Application No. 12191865.0, dated May 13, 2013, 7 pages.

(Continued)

*Primary Examiner* — Philip J Bonzell
(74) *Attorney, Agent, or Firm* — Lightfoot & Alford PLLC

(57) ABSTRACT

According to one embodiment, a method for determining a position of a rotor blade includes receiving a plurality of measurements from a plurality of magneto-resistive sensors and determining a position of the at least one magnet based on the received plurality of measurements. In this example, one of the plurality of magneto-resistive sensors and the at least one magnet moves with a rotor blade.

20 Claims, 16 Drawing Sheets

(56) References Cited

U.S. PATENT DOCUMENTS

2009/0278638 A1   11/2009  Giroud et al.
2009/0322325 A1*  12/2009  Ausserlechner ....... G01D 5/145
                                                                      324/260
2010/0230547 A1    9/2010  Tayman
2011/0298447 A1   12/2011  Foletto et al.

OTHER PUBLICATIONS

Office Action in related U.S. Appl. No. 13/601,077, dated Jun. 20, 2014, 9 pages.
Office Action in related Canadian Patent Application No. 2,823,463, dated Jan. 22, 2015, 4 pages.
Notice of Allowance in related Canadian Patent Application No. 2,823,463, dated Dec. 22, 2015, 1 page.

* cited by examiner

ROTOR POSITION DETERMINATION SYSTEM WITH MAGNETO-RESISTIVE SENSORS

RELATED APPLICATIONS

Pursuant to 35 U.S.C. §120, this application is a continuation-in-part of and claims priority to U.S. patent application Ser. No. 13/601,077, entitled Rotor Position Determination System with Hall-Effect Sensors, filed Aug. 31, 2012. U.S. Provisional patent application Ser. No. 13/601,077 is hereby incorporated by reference.

TECHNICAL FIELD

This invention relates generally to rotor systems, and more particularly, to a rotor position determination system with magneto-resistive sensors.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

Particular embodiments of the present disclosure may provide one or more technical advantages. A technical advantage of one embodiment may include the capability to measure how rotor blades move in response to forces such as lead-lag forces, flapping forces, and feathering forces. A technical advantage of one embodiment may include the ability to detect degradation of elastomeric components of a rotor system by measuring spanwise displacements as they change over time. A technical advantage of one embodiment may include the capability to measure these displacements during operation of the rotorcraft and outside of a test environment.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 6A shows the magnets of FIG. 5A in a neutral position;

FIG. 6B shows the magnets of FIG. 5A in a pushed-down position;

FIG. 6C shows the magnets of FIG. 5A in a pushed-left position;

FIG. 6D shows the magnets of FIG. 5A in a feathered position;

FIG. 7A shows an example cross-section view of the magnets of FIG. 5A and the sensors of FIG. 5B disposed between the hub and the blade of FIG. 2;

FIG. 7B shows a plan view of the sensor arrays of FIG. 7A according to one example embodiment;

FIGS. 7C-7H show calibration models for the various sensors of the sensor array of FIG. 5B according to one example embodiment;

FIGS. 7C and 7D show a calibration model for the vertical sensors on the left-hand side of the sensor array of FIG. 5B;

FIGS. 7E and 7F show a calibration model for the vertical sensors on the right-hand side of the sensor array of FIG. 5B;

FIGS. 7G and 7H show a calibration model for the horizontal sensor of FIG. 5B.

DETAILED DESCRIPTION OF THE DRAWINGS

Figure 1:
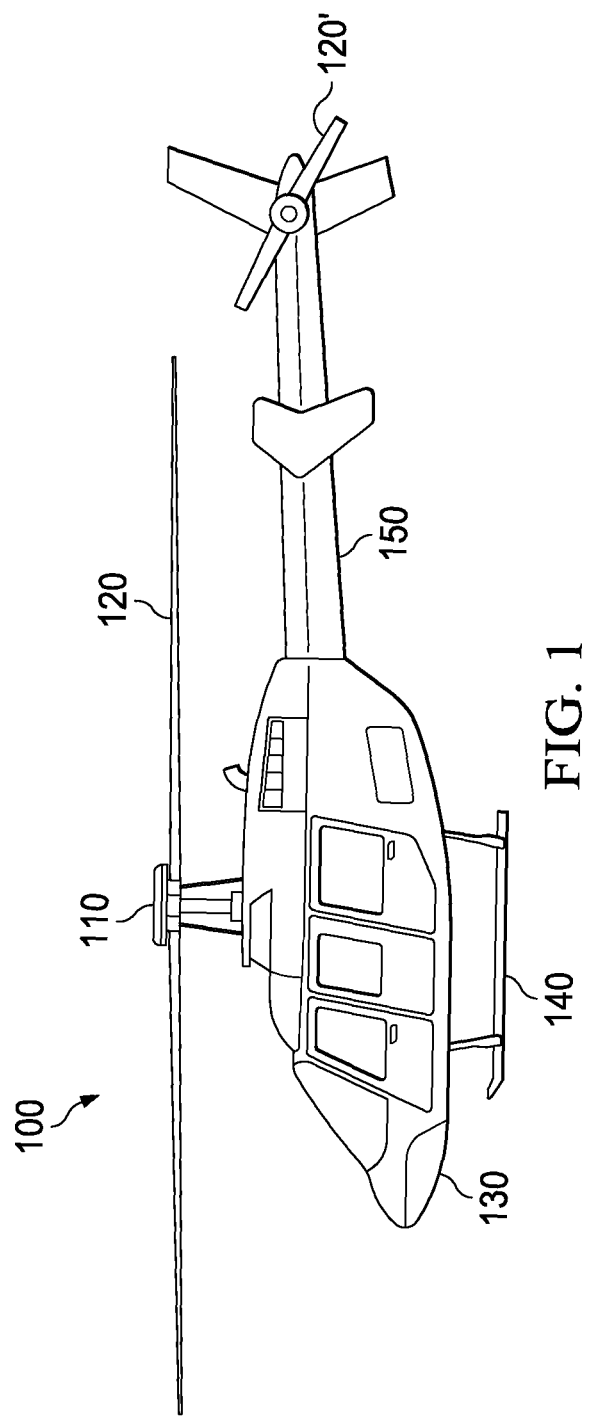
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120.

Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
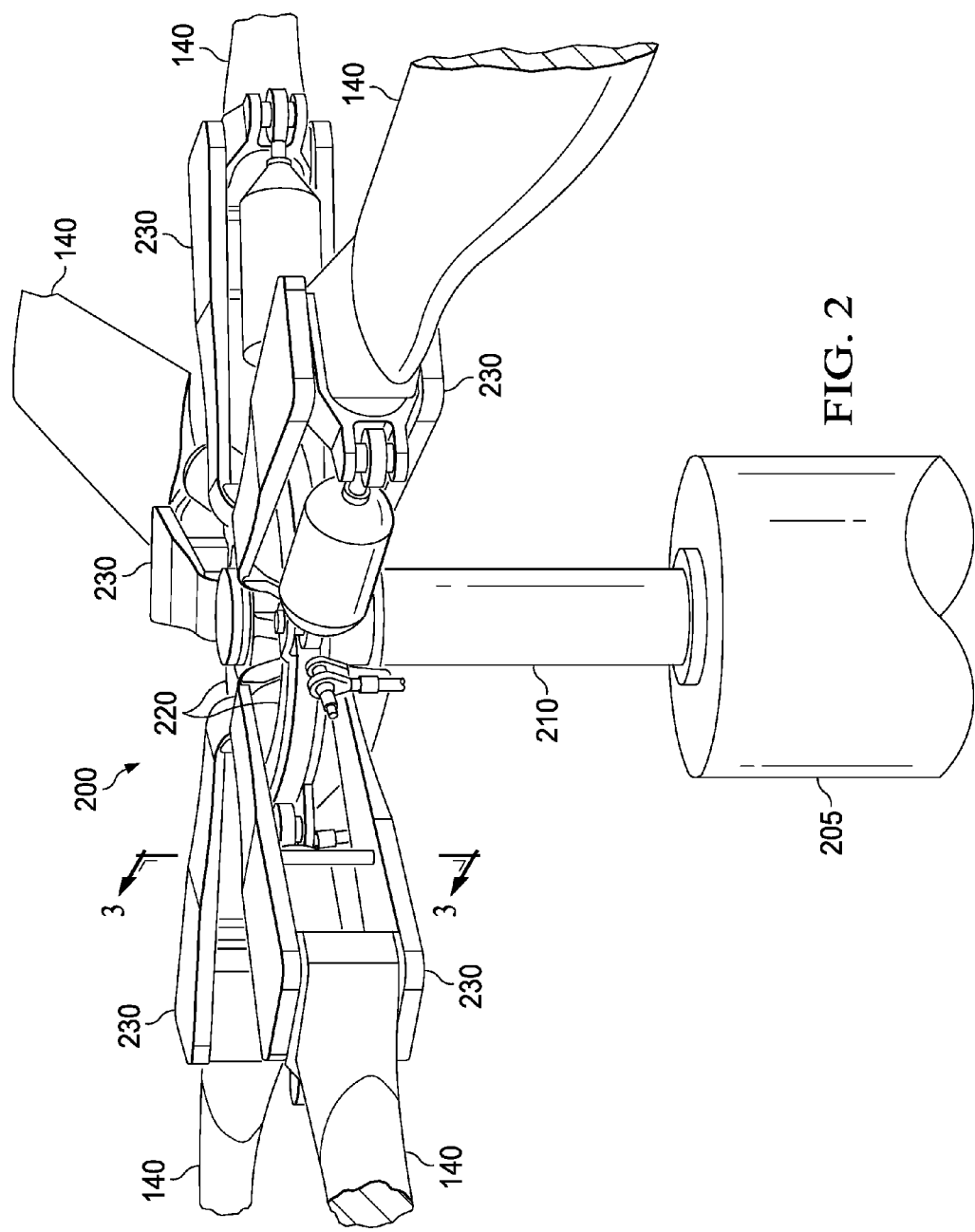
FIG. 2 shows the rotor system and blades of the rotorcraft of FIG. 1 according to one example embodiment.

FIG. 2 shows a rotor system 200 according to one example embodiment. Rotor system 200 may represent one example of rotor system 110 of FIG. 1. Rotor system 200 features a drive train 205, a drive shaft 210, a hub 220, and grips 130 coupled to blades 140. In some examples, rotor system 200 may include more or fewer components. For example, FIG. 1 does not show components such as a gearbox, a swash plate, drive links, drive levers, and other components that may be incorporated.

Power train 205, drive shaft 210, and hub 220 are mechanical components for generating and transmitting torque and rotation. Power train 205 may include a variety of components, including an engine, a transmission, and differentials. In operation, drive shaft 210 receives torque or rotational energy from power train 205 and rotates hub 220. Blades 140 are coupled to hub 220 by grips 230. Rotation of hub 220 causes grips 230 and blades 140 to rotate about drive shaft 210.

As will be explained in greater detail below, grips 230 and blades 140 may be subject to a variety of different forces. For example, rotation of grips 230 and blades 140 may result in a centrifugal (CF) force against grips 230 and blades 140 in a direction away from drive shaft 210. In addition, the weight of grip 230 and blade 140 may result in a transverse force being applied against grip 230.

Figure 3:
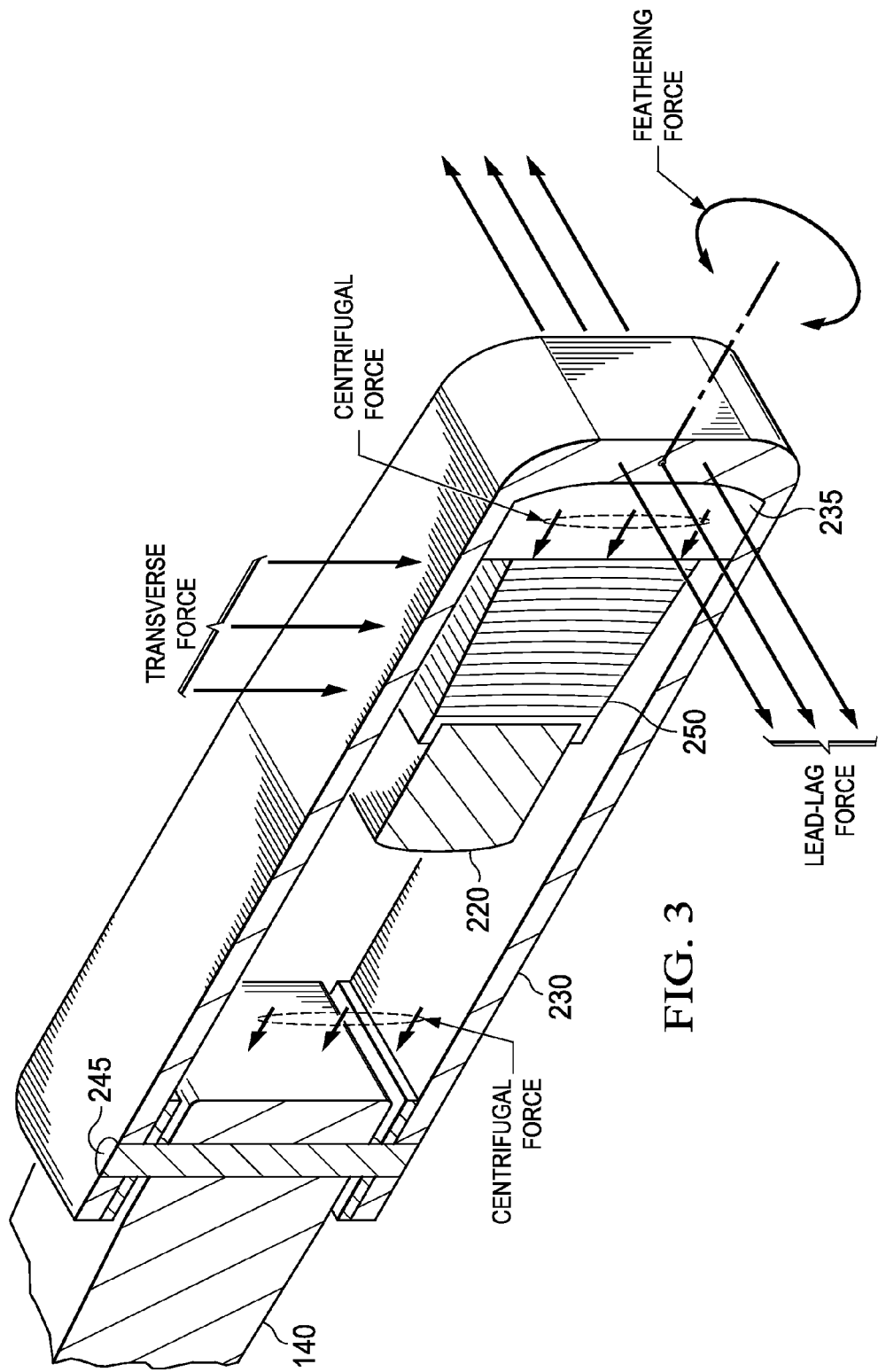
FIG. 3 shows a cross-section of a grip during operation of the rotor system of FIG. 2.

FIG. 3 shows a cross-section of a grip 130 of FIG. 2 during operation of rotor system 200. As shown in FIG. 3, blade pin 245 couples blade 140 to grip 230. In addition, bearing mount 235 and elastomeric bearing 250 separates hub 220 from grip 230.

Bearing mount 235 provides a surface for supporting elastomeric bearing 250. In some embodiments, bearing mount 235 is formed from a metallic material such as titanium. Elastomeric bearing 250 separates bearing mount 235 from hub 220. Elastomeric bearing 250 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

In operation, elastomeric bearing 150 may be subject to centrifugal forces, transverse forces, lead-lag forces, and feathering forces. For example, rotation of blade 140 about driveshaft 210 results in a centrifugal force against blade pin 245 in a direction away from driveshaft 210. Blade pin 245 transfers the centrifugal force to grip 230, which then transfers the centrifugal force to elastomeric bearing 250 through bearing mount 235. Because elastomeric bearing 250 is positioned between bearing mount 235 and hub 220, the centrifugal force caused by rotation of blade 140 results in compression of elastomeric bearing 250.

Elastomeric bearing 250 may have a cross-sectional area that increases from hub 220 to bearing mount 235. In operation, elastomeric bearing 250 may be subject to compression between hub 220 and bearing mount 235. Having an increasing cross-sectional area may allow elastomeric bearing 250 to absorb and dissipate compression forces.

Elastomeric bearing 250 is also subject to transverse, lead-lag, and feathering forces. For example, the weight of grip 230 and blade 140 results in a transverse force being applied against elastomeric bearing 250. In addition, blades 140 may not rotate precisely with hub 220, resulting in a lead-lag force being applied against elastomeric bearing 250. Furthermore, twisting of grip 230 and blade 140 during operation may result in a feathering force being applied to elastomeric bearing 250.

Teachings of certain embodiments recognize the capability to measure how blade 140 moves in response to some or all of these forces. In addition, teachings of certain embodiments recognize the ability to measure the degradation of various components, such as elastomeric bearing 250. Teachings of certain embodiments recognize the capability to measure these displacements during operation of the rotorcraft and outside of a test environment.

By measuring how blade 140 moves, rotor system 200 may be tested for various instabilities, loads, and vibrations. Teachings of certain embodiments also recognize the capability to decouple the lead-lag, flapping, and feathering displacements, which can be difficult when these displacements center about a common point, as with articulated rotors having a single elastomeric bearing 250.

In addition, measuring during operation of the rotorcraft increases the amount data available as compared to only measuring in a test environment. Furthermore, measuring during operation may allow maintenance crews to determine whether parts need replacement based on the strains and stresses they have experienced during operation. For example, measuring during operation may allow for accurate prediction of when elastomeric bearing 250 should be replaced. Such functions may be incorporated as part of an integrated vehicle health management (IVHM) system that monitors vehicle usage. In addition, measuring during operation of the aircraft may allow for accurate determinations of fatigue usage credits.

Furthermore, measuring during operation may provide accurate real-time data to active damping and stabilization systems. For example, an active lead-lag damper may increase dampening in response to measured movements of blade 140. Teachings of certain embodiments also recognize the capability to provide measurements for feedback systems for loads control and flight trim optimization. In addition, teachings of certain embodiments recognize the capability to provide information to a pilot during operation of a rotorcraft, such as information alerting the pilot when blade movement exceeds a predetermined threshold.

Figure 4A:
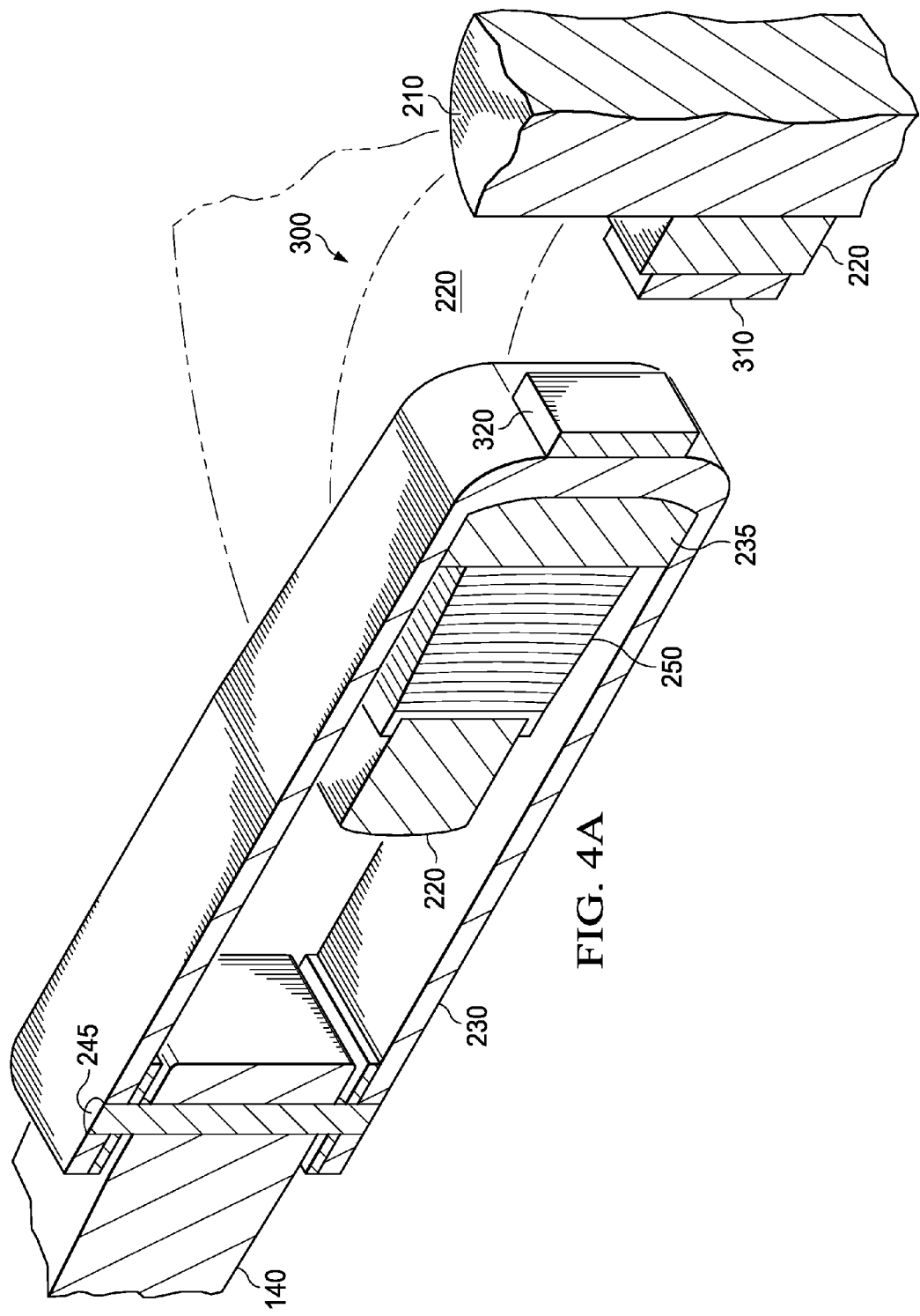
FIG. 4A shows the grip of FIGS. 2 and 3 equipped with a position determination system according to one example embodiment.
Figure 4C:
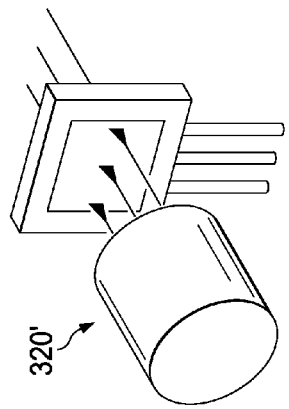
FIG. 4C shows an example of a hall-effect sensor that may be incorporated into the position determination system of FIG. 4A.
Figure 4D:
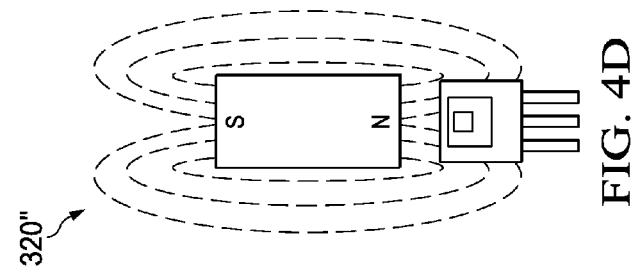
FIG. 4D shows an example of a magneto-resistive sensor that may be incorporated into the position determination system of FIG. 4A.
Figure 4B:
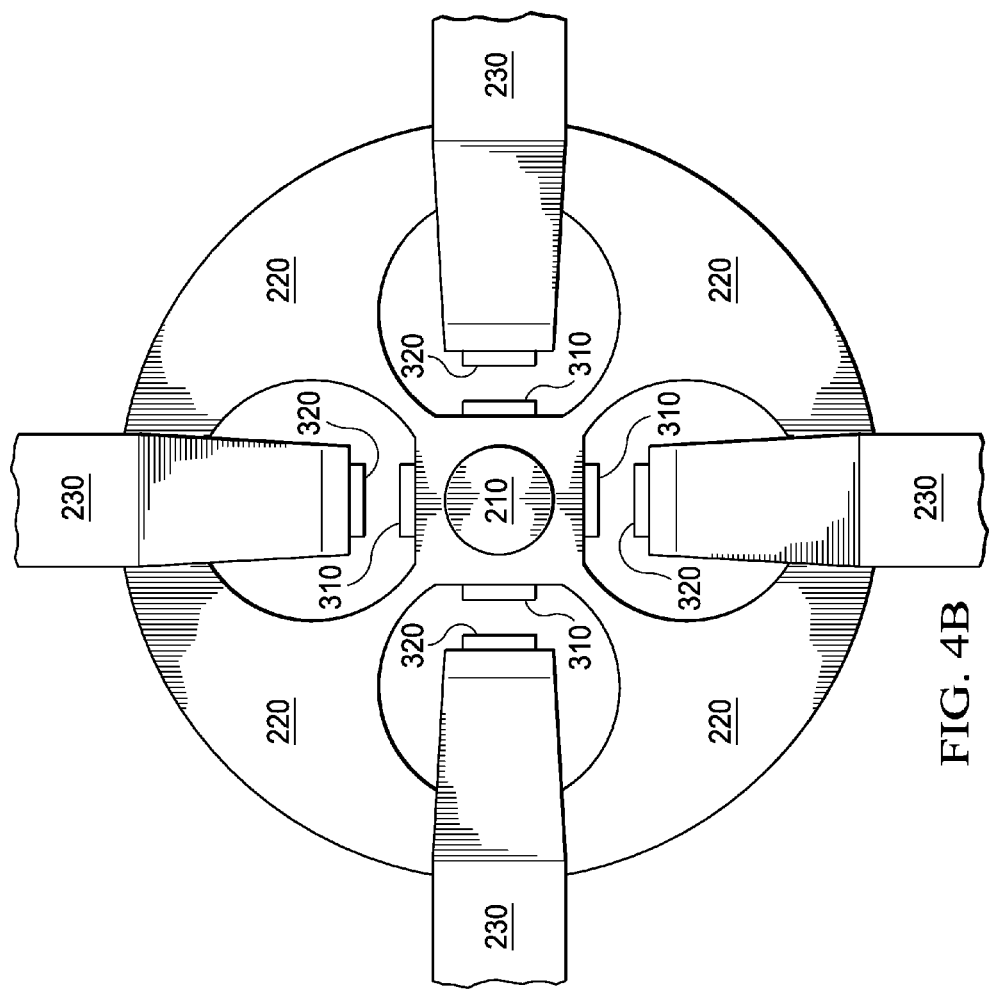
FIG. 4B shows a cross-section of the hub of the rotor system of FIG. 2 equipped with the position determination system of FIG. 4A.

FIGS. 4A and 4B show rotor system 200 equipped with a position determination system 300. FIG. 4A shows a cross-section of grip 230 equipped with position determination system 300, and FIG. 4B shows a cross-section of hub 220 equipped with position determination system 300. In the examples of FIGS. 4A and 4B, position determination system 300 features magnets 310 and an array of sensors 320.

Magnets 310 may include any material that produces a magnetic field. A magnetic field represents the magnetic influence of a magnet on electric currents and other magnetic materials. Examples of magnets 310 may include, but are not limited to, ferromagnetic materials, composite magnetic materials, rare-earth magnets, and electromagnets.

In the example of FIGS. 4A and 4B, sensors 320 may represent a variety of different sensor types. Two example sensor types are hall-effect sensors and magneto-resistive sensors. FIG. 4C shows an example hall-effect sensor 320', and FIG. 4D shows an example magneto-resistive sensor 320".

Sensors 320' are Hall-effect sensors. Hall-effect sensors are transducers that vary their output voltage in response to the normal magnetic field strength of a magnetic field, such as shown in FIG. 4C. Applied to the example of FIGS. 4A and 4B, each sensor 320' may vary its output voltage based on the magnetic field produced by magnets 310. Because the magnetic field produced by magnets 310 is stronger near magnets 310 and weaker away from magnets 310, the value of the voltage output of each sensor 320' may depend on its proximity to magnets 310. In this manner, each voltage output from sensors 320' may indicate the position of magnets 310 from sensors 320'.

Sensors 320" are magneto-resistive sensors. Magneto-resistive sensors vary their electrical resistance in response to the flux angle of a magnetic field. Magneto-resistive sensors measure the magnetic flux orientation, whereas hall-effect sensors change their output based on magnetic flux magnitude. Magneto-resistive sensors may operate in saturation mode, and can allow for larger changes in magnetic flux strength. This may enable various advantages for the intelligent sensor system, such as the use of smaller and/or fewer magnets to generate the field through which the sensor array operates. In addition, magneto-resistive sensors may be less sensitive to the gap between the sensors and the magnets and may be less sensitive to temperature changes.

In yet an alternative embodiment, the field and sensor type may be some type other than magnetic in nature. For example, the field could be optical, generated by a light source such as an LED or laser. The sensor array would likewise sense either the magnitude or orientation of the light field permeating from the source in 3D space. Certain advantages may be obtained from an optical medium such as greater allowable distance between the field source and the sensor arrays compared to a magnetic based field and array system.

An alternative embodiment would include a hybrid sensor array consisting of two or more sensor types. For example, a hybrid magnetic sensor array may have sensors that detect magnetic strength (Hall-type) and magnetic flux orientation (magneto-resistive). Certain advantages may be obtained from a hybrid sensor array of this type such as reduced magnetic field requirements and increased sensor system accuracy. In another hybrid embodiment, one or more field and/or sensor types could be used in combination. For example, a magnetic sensor could be used in combination with an optical sensor to detect a combined magnetic and optical field combination. This combination might allow certain advantages such as higher accuracy with certain allowance for optical contamination.

Returning to the example of FIGS. 4A and 4B, magnets 310 and sensors 320 are disposed between hub 220 and blade 140. In particular, magnets 310 are coupled to hub 220, and sensors 320 are coupled to grip 230, which couples blade 140 to hub 220. In an alternative embodiment, sensors 320 are coupled to hub 220 instead of magnets 310.

The example of FIGS. 4A and 4B may resemble how magnets 310 and sensors 320 may be used in an articulated rotor system. In some embodiments, however, magnets 310 and/or sensors 320 may be disposed in alternative locations to measure the position of blades 140. In addition, teachings of certain embodiments recognize that magnets 310 and sensors 320 may be used in rotor systems other than an articulated rotor system. As one example, magnets 310 and sensors 320 may be used in a gimbaled rotor system, such as used in some tilt-rotor aircraft. Unlike an articulated rotor, a gimbaled rotor may not have relative motion between the blades and the yoke. In this example, the relative motion may be between the rotor system and the rotor mast. In such an example, magnets 310 and sensors 320 may be disposed between the rotor system and the rotor mast so as to measure relative motion.

Figure 5A:
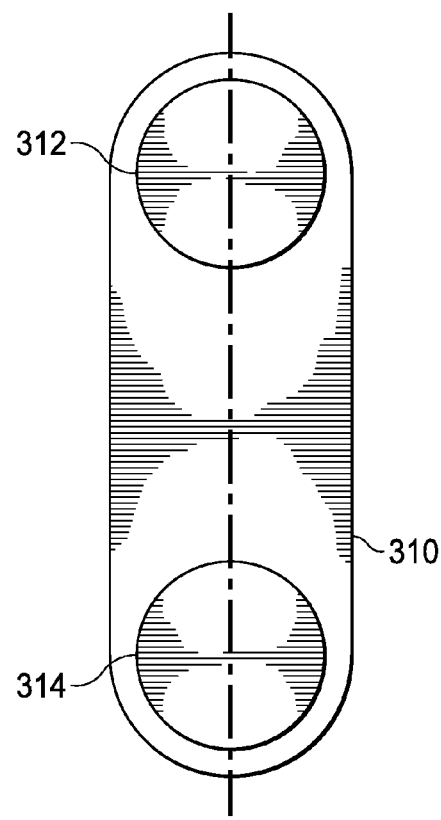
FIG. 5A shows magnets of the position determination system of FIG. 4A according to one example embodiment.

FIG. 5A shows magnets 310 according to one example embodiment. In the example of FIG. 5A, magnets 310 include a magnet 312 and a magnet 314. As will be explained in greater detail below, providing two or more magnets 310 may allow position determination system 300 to determine the location of magnets 310 in up to six dimensions, including the following three germane to articulated rotors: left-right relative to sensors 320 (indicative of lead-lag displacement), up-down relative to sensors 320 (indicative of transverse displacement), and rotation of magnets 310 (indicative of feathering displacement). In some embodiments, however, more or fewer magnets 310 may be used.

Figure 5B:
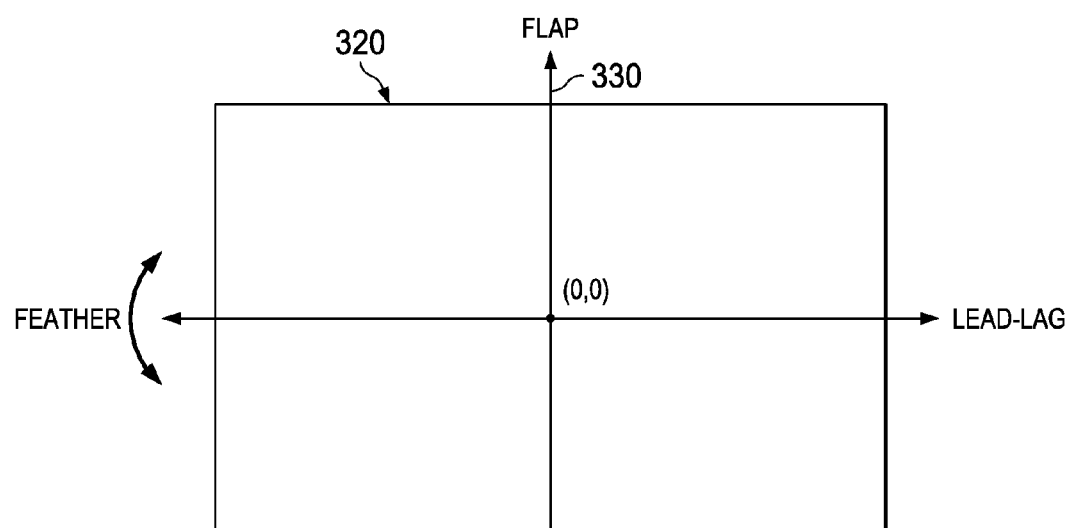
FIG. 5B shows sensors of the position determination system of FIG. 4A according to one example embodiment.

FIG. 5B shows a coordinate 330 of sensors 320. Coordinate 330 features an x-axis (indicative of lead-lag displacement) and a y-axis (indicative of transverse displacement). Rotation within coordinate 330 may be indicative of feathering displacement.

Figure 6A:
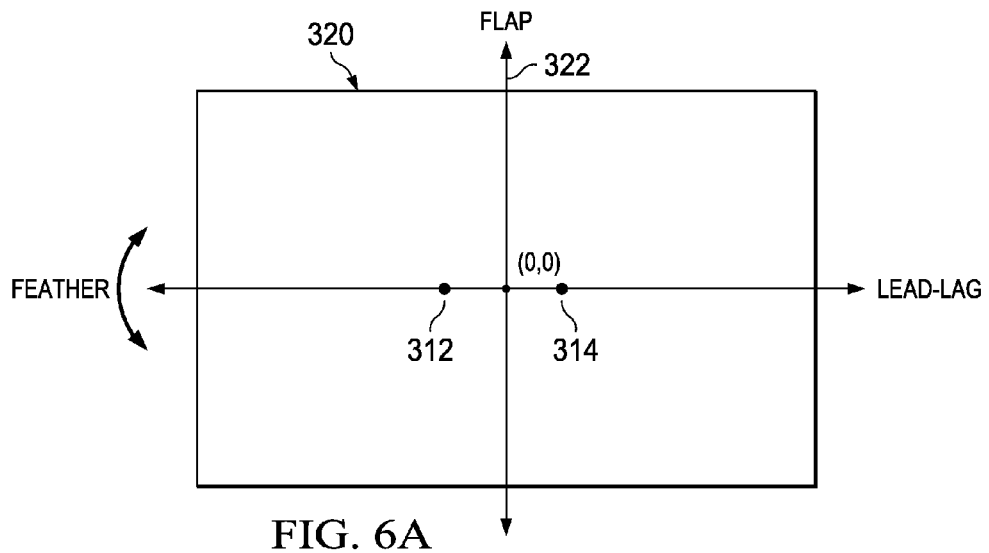
FIGS. 6A-6D shows relative positions of the magnets of FIG. 5A to the sensors of FIG. 5B relative to a coordinate system during various stages of operation of the rotor system of FIG. 2.

Outputs from sensors 320 may be used to plot the locations of magnets 310 on coordinate 330. For example, FIG. 6A shows magnets 312 and 314 in a neutral position. Defining a neutral position of magnets 312 and 314 may be useful in identifying relative displacements of blade 140.

Figure 6B:
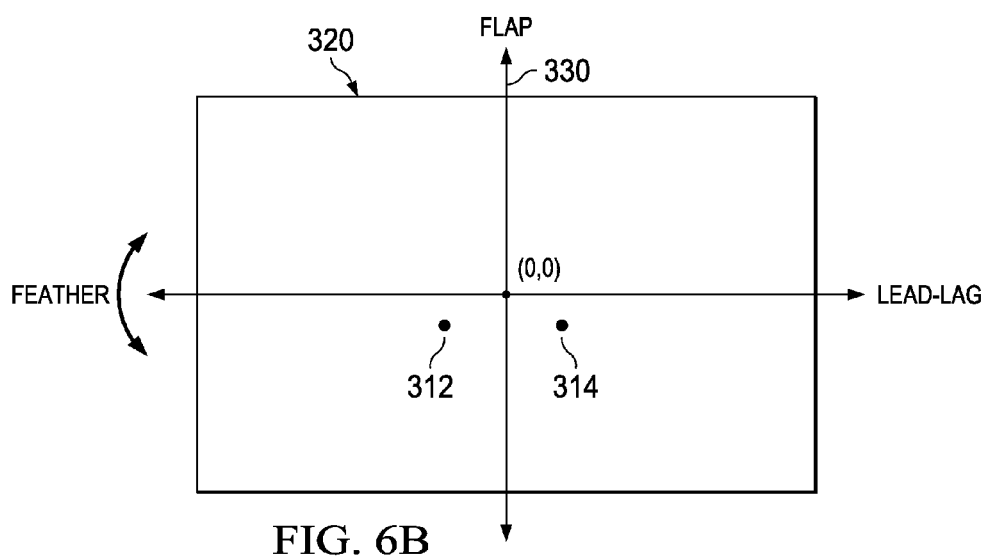
Figure 6C:
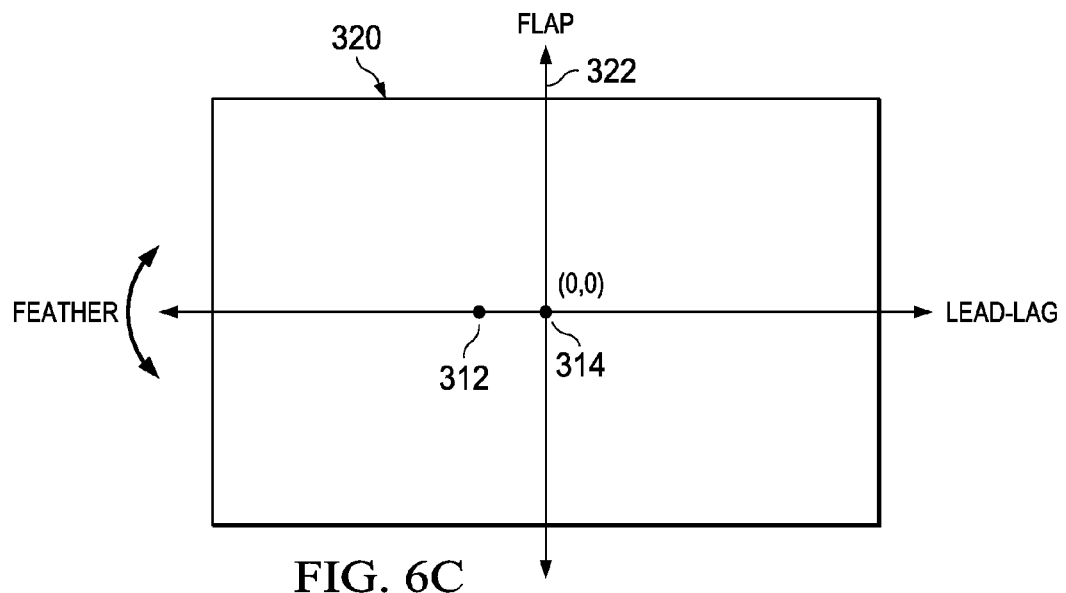
Figure 6D:
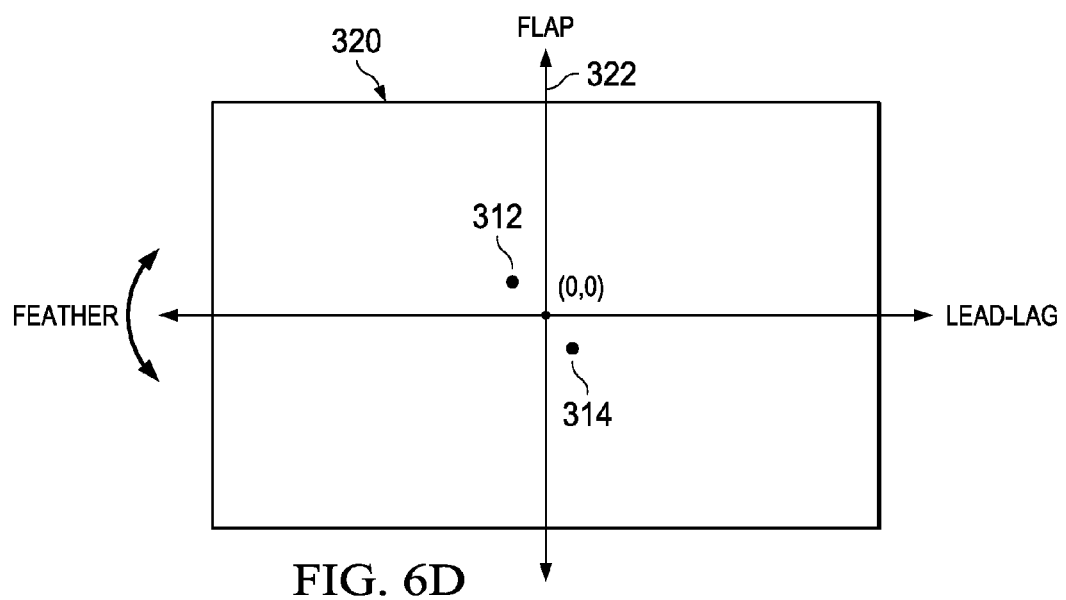

For example, as blade 140 flaps upwards, magnets 312 and 314 are pushed downwards, as shown in FIG. 6B. As another example, as blade 140 lags behind rotation of hub 220, magnets 312 and 314 move to the left of coordinate 330, as shown in FIG. 6C. As blade 140 rotates, or feathers, magnets 312 and 314 rotate relative to coordinate 330, as shown in FIG. 6D. Thus, by determining the location of magnets 312 and 314 relative to coordinate 330, the flapping, lead-lag, and feathering displacements may be determined.

In the examples of FIGS. 6A-6D, magnets 312 and magnets 314 are plotted relative to coordinate 330. Teachings of certain embodiments recognize the capability of sensors 320 to uniquely identify magnets 310 so as to distinguish magnet 312 from magnet 314. For example, teachings of certain embodiments recognize that magnets 310 may be uniquely identified if magnets 312 and 314 produce different magnetic fields.

As explained above, outputs from sensors 320 may be used to plot the locations of magnets 320 on coordinate 330. How location plots are determined from sensor outputs may depend on the type of sensor. For example, FIGS. 7A-7H show a magneto-resistive rotor position determination system 400 (hereinafter referred to as MR system 400) according to one example embodiment. In this example embodiment, MR system 400 features magnets 410 and sensor arrays 420 and 430. Magnets 410 may share similarities with the magnets 310 of position determination system 300. Sensor arrays 420 and 430 may represent examples of sensors 320 of position determination system 300.

Figure 7A:
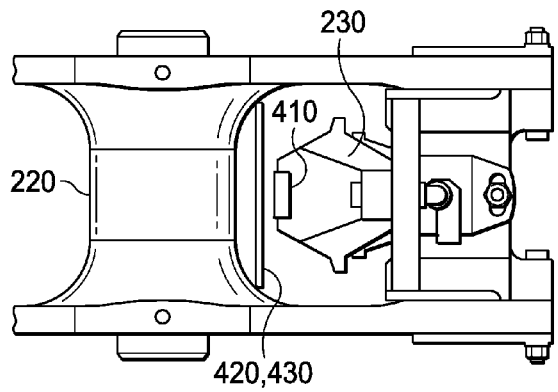
FIGS. 7A-7H show a magneto-resistive rotor position determination system that may represent one example of the example position determination system of FIG. 4A.

FIG. 7A shows an example cross-section view of magnets 410 and sensor arrays 420 and 430 disposed between a hub (such as hub 220) and a blade (such as blade 140). In the example of FIG. 7A, sensor arrays 420 are coupled to hub 220, and magnets 410 are coupled to grip 230, which couples blade 140 to hub 220. FIG. 7A also shows magnets 410 located relative to sensor arrays 420 and 430. In an alternative embodiment, magnets 410 are coupled to hub 220 instead of sensor arrays 420 and 430.

Figure 7B:
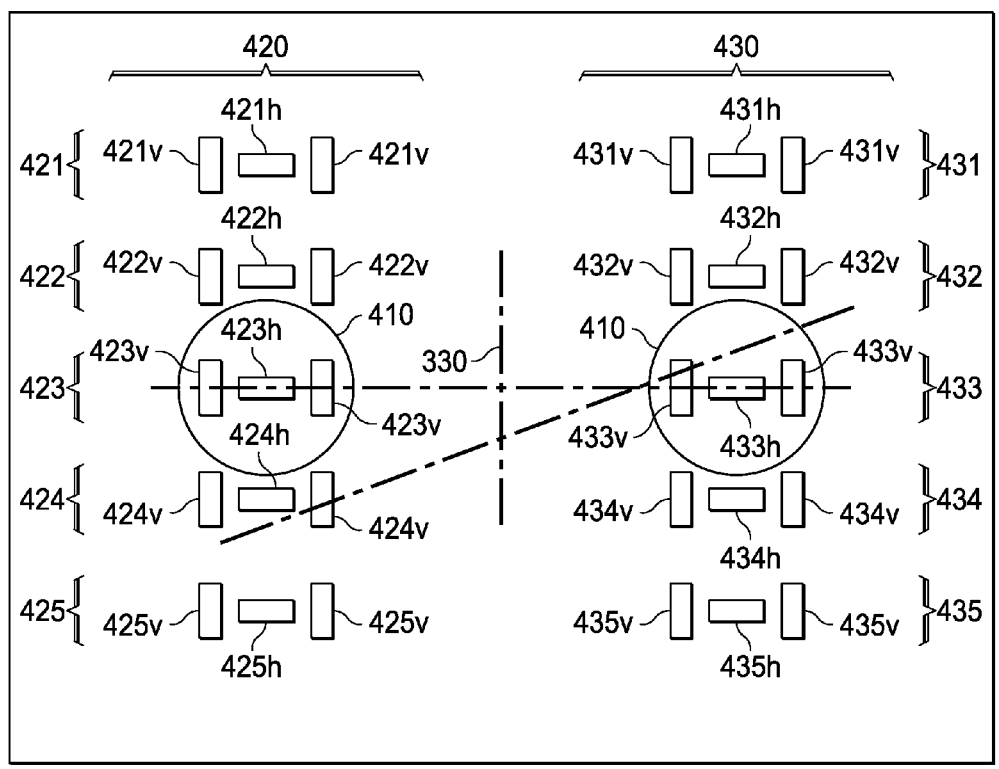

FIG. 7B shows a plan view of the sensor arrays 420 and 430 of FIG. 7A according to one example embodiment. FIG. 7B also shows where magnets 410 and a coordinate system such as coordinate system 330 may be located relative to sensor arrays 420 and 430.

In the example of FIG. 7B, sensor array 420 features five sensor clusters 421-425, and sensor array 430 features five sensor clusters 431-435. Each sensor cluster features sensors aligned vertically and one sensor aligned horizontally. For example, sensor cluster 421 features a horizontally-aligned sensor 421h situated between two vertically-aligned sensors 421v, sensor cluster 422 features a horizontally-aligned sensor 422h situated between two vertically-aligned sensors 422v, and so on. In the example of FIG. 7B, each vertically-aligned and horizontally-aligned sensor represents a magneto-resistive sensor.

Teachings of certain embodiments recognize that the sensing area of each sensor may be dependent on the directional alignment of each sensor. An alignment of a sensor may represent the direction in which the sensor has a larger sensing area. For example, horizontally-aligned sensors have a larger sensing area from left-to-right but have a smaller sensing area from top-to-bottom. On the other hand, vertically-aligned sensors have a smaller sensing area from left-to-right but have a larger sensing area from top-to-bottom. Example sensing areas for horizontally-aligned and vertically-aligned sensors are described with regards to FIGS. 7C, 7E, and 7F. In the example of FIG. 7B, horizontally-aligned and vertically-aligned sensors are provided together to provide a larger sensing area in both the left-to-right direction and the top-to-bottom direction.

In operation, according to one example embodiment, MR system 400 scans sensor arrays 420 and 430 and evaluates the outputs from each sensor to assess which sensor is probably providing the most accurate measurement representative of the magnet's location. For example, MR system 400 may determine which sensor(s) in each sensor array is closest to the magnets. MR system 400 may use a model to convert the sensor outputs to an x-y position of each magnet 410.

For example, FIGS. 7C-7H show calibration models for the various sensors of sensor array 420 according to one example embodiment. These calibration models represent linear calibration models. Teachings of certain embodiments recognize that linear calibration models utilize certain characteristics of magnetic flux lines and magneto-resistive sensors. For example, the example of FIG. 4D shows magnetic flux lines that curve around a magnet having north and south poles. When viewing these magnetic flux lines as a whole, they appear highly curved and without any linear portions. However, these magnetic flux lines actually include somewhat linear portions. For example, the magnetic flux lines may appear to be linear next to the north pole of the magnet. In the example of FIG. 4D, the magneto-resistive sensor just happens to be located in this "linear region" of the magnetic flux lines.

Accordingly, teachings of certain embodiments recognize the capability to use linear calibration models to convert the sensor outputs to x-y positions because the magnetic flux lines may behave somewhat linearly where the magneto-resistive sensors are located. In some embodiments, these linear calibration models are not necessarily linear. For example, higher-order curve fits (e.g., fourth-order polynomials) may be used. In these examples, however, the curvature may still be relatively low. As used herein, "linear" may refer to both actually linear and approximately linear, including higher-order polynomials.

Figure 7C:
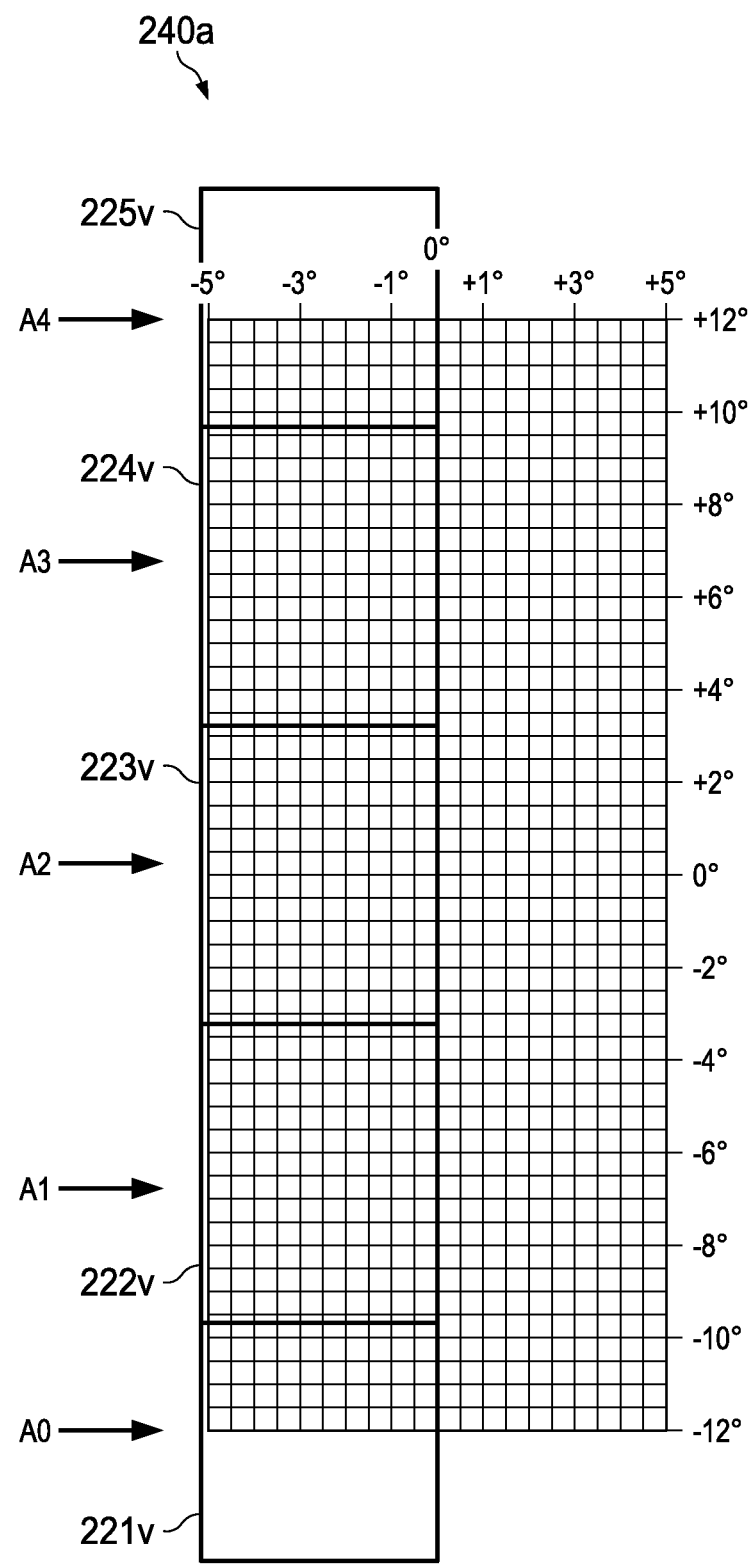
Figure 7D:
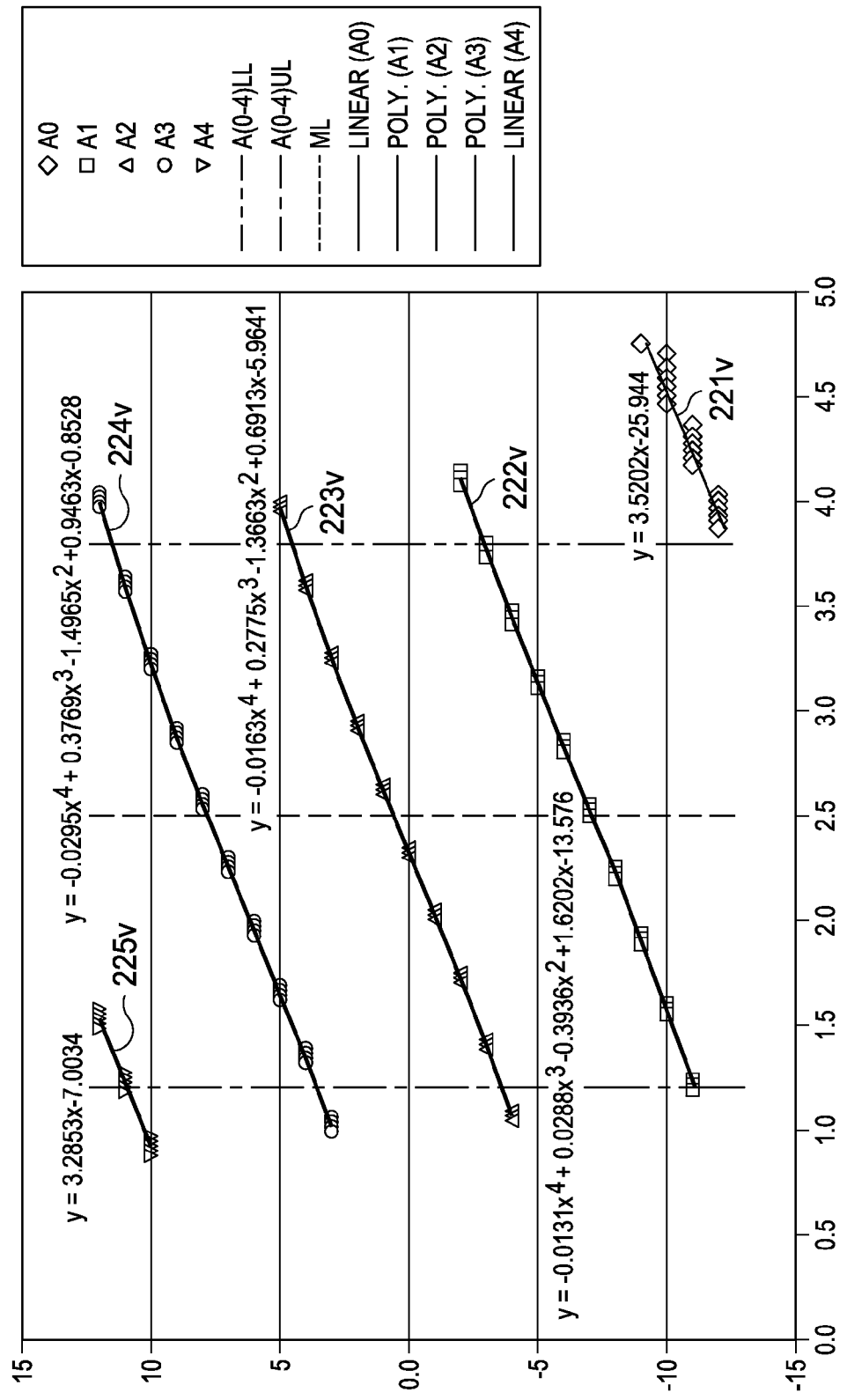

FIGS. 7C and 7D show a calibration model for the vertical sensors 221v-225v on the left-hand side of sensor array 420. In the example of FIG. 7C, each sensor 221v-225v has a calibrated accuracy range 240a. In some embodiments, calibrated accuracy range 240a may be populated using various testing data. For example, sensor 222v may provide accurate measurements if magnet 410 is located within five degrees left of the vertical centerline and between four and ten degrees below the horizontal centerline. In the example of FIG. 7D, sensor measurement model 250a shows a linear curve fit for the measurement output of each sensor 221v-225v within each sensor's calibrated accuracy range. For example, sensor 222v has an output range of approximately three volts within the calibrated accuracy range of sensor 222v.

Figure 7E:
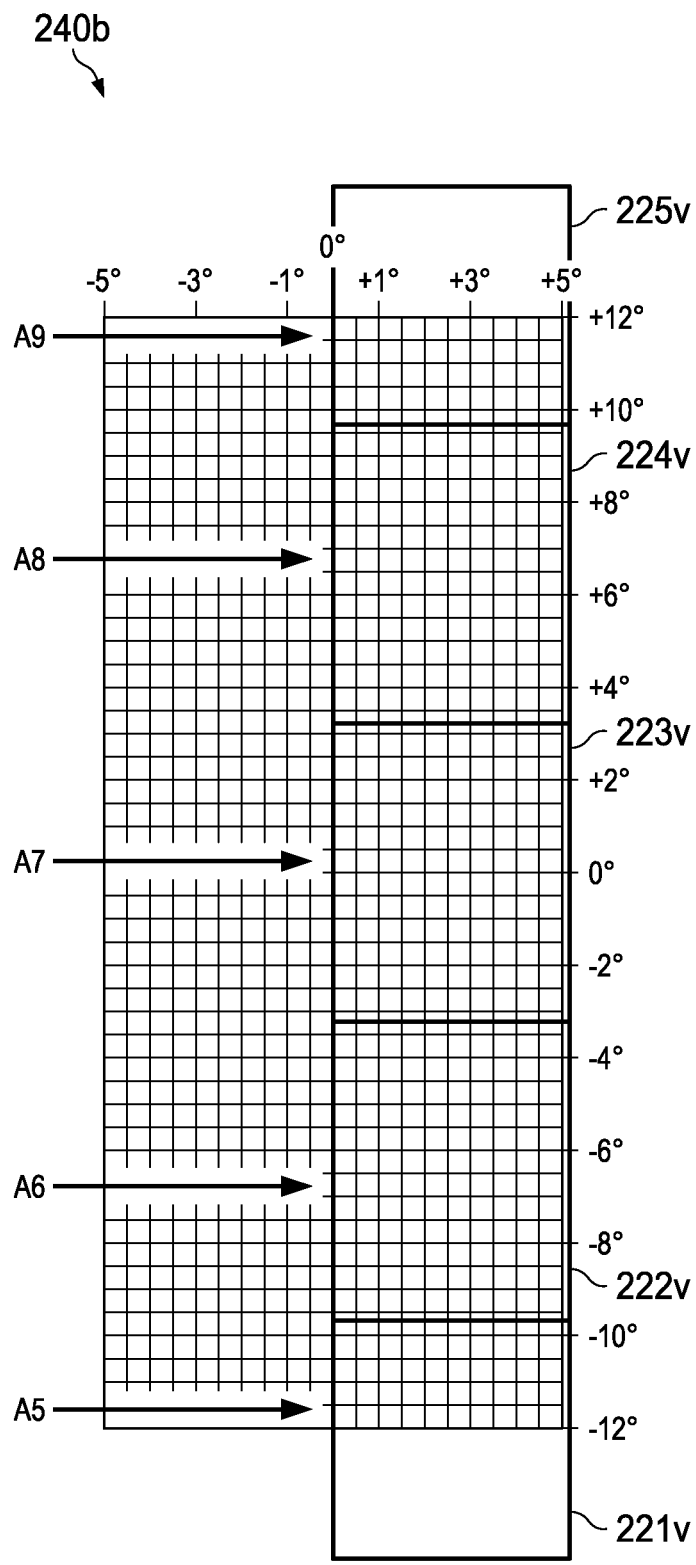
Figure 7F:
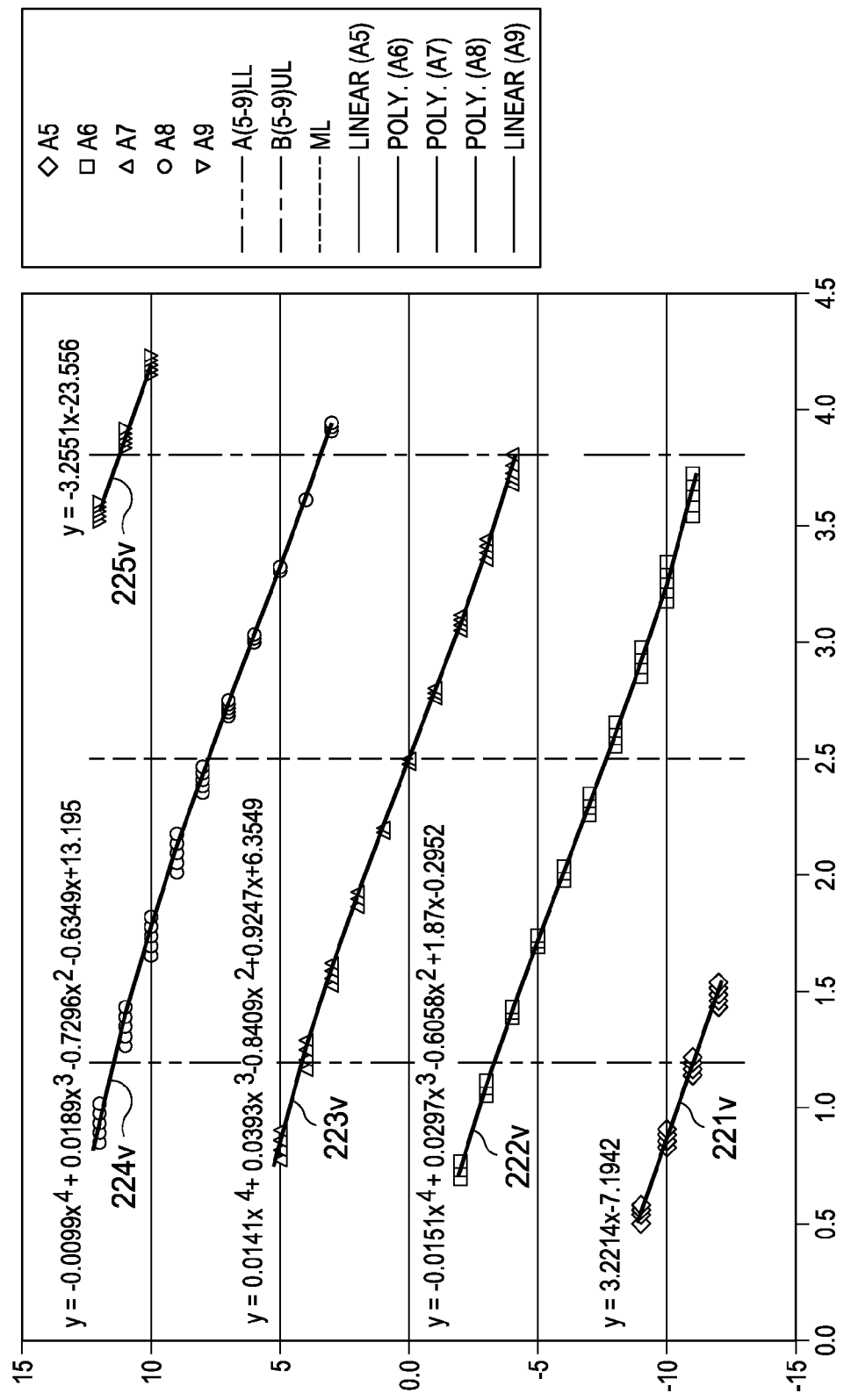

Similarly, FIGS. 7E and 7F show a calibration model for the vertical sensors 221v-225v on the right-hand side of sensor array 420. In the example of FIG. 7E, each sensor 221v-225v has a calibrated accuracy range 240b. In some embodiments, calibrated accuracy range 240b may be populated using various testing data. For example, sensor 222v may provide accurate measurements if magnet 410 is located within five degrees right of the vertical centerline and between four and ten degrees below the horizontal centerline. In the example of FIG. 7F, sensor measurement model 250b shows a linear curve fit for the measurement output of each sensor 221v-225v within each sensor's calibrated accuracy range. For example, sensor 222v has an output range of approximately three volts within the calibrated accuracy range of sensor 222v.

Figure 7G:
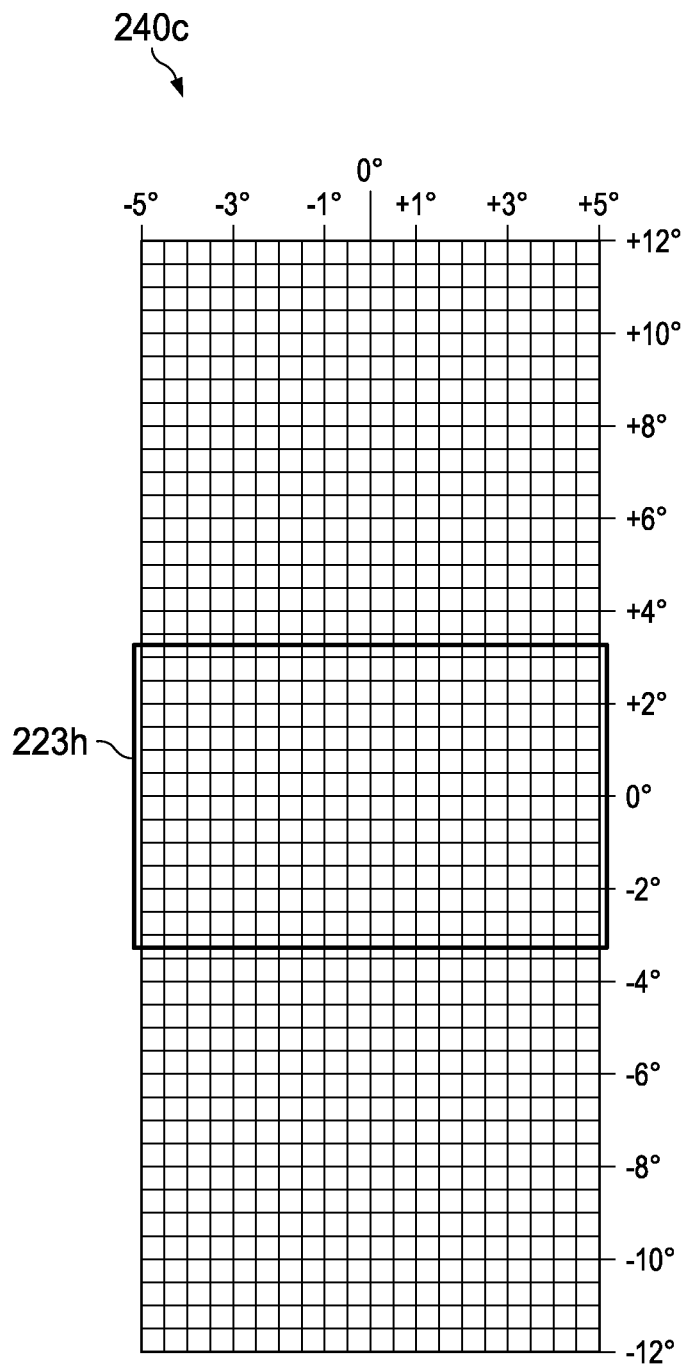
Figure 7H:
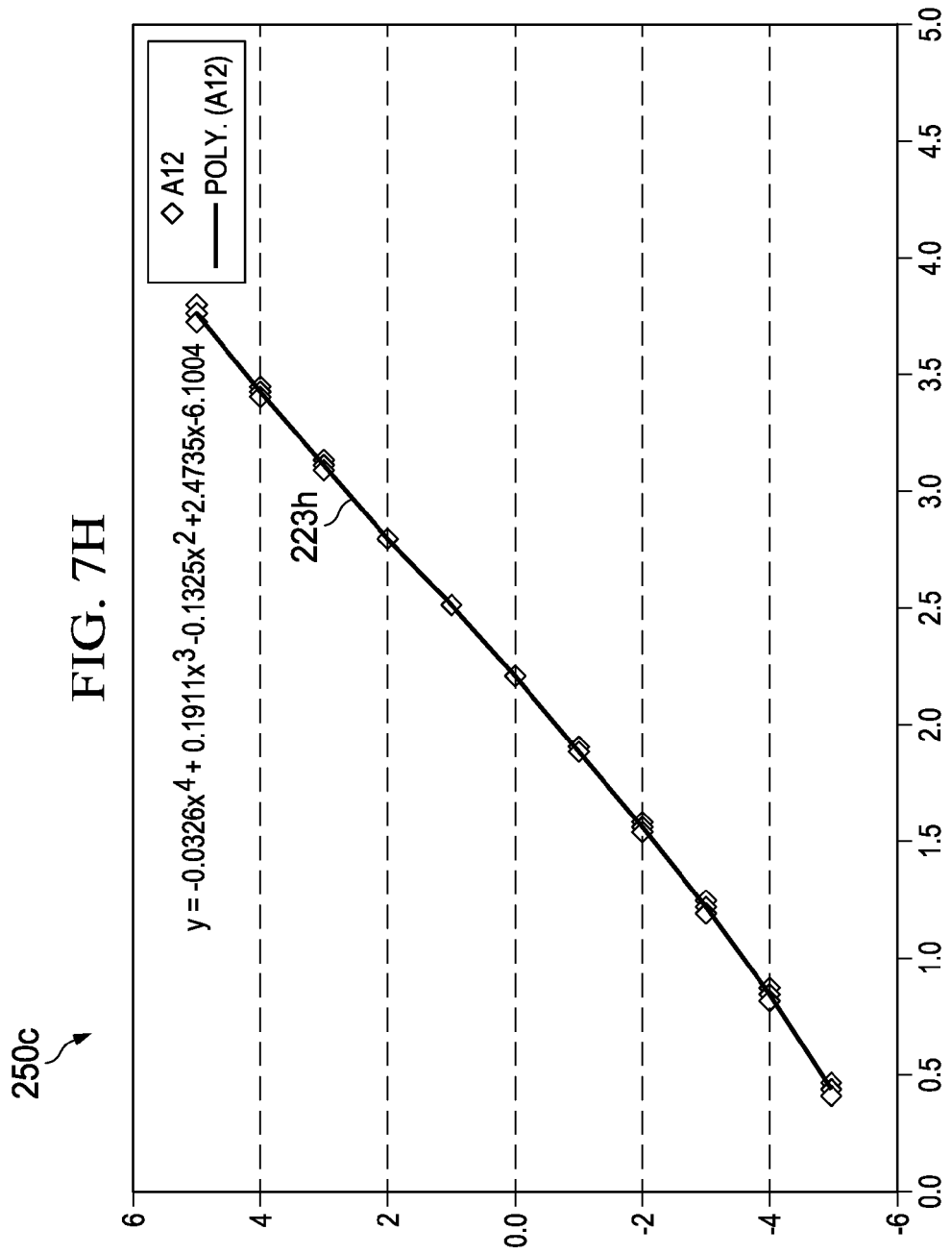

Each horizontal sensor may also have a calibration model. For example, FIGS. 7G and 7H show a calibration model for horizontal sensor 223h. In the example of FIG. 7G, sensor 223h has a calibrated accuracy range 240c of approximately +/- five degrees of the vertical centerline and +/- three degrees of the horizontal centerline. In the example of FIG. 7H, sensor measurement model 250b shows a linear curve fit for the measurement output of sensor 223h. In this example, sensor 223h has an output range of approximately 3.5 volts within the calibrated accuracy range of sensor 223v.

In operation, according to one example embodiment, MR system 400 evaluates the outputs from each sensor to determine which sensor is providing the most accurate measurement representative of the magnet's location. For example, MR system 400 may compare the received outputs from each sensor to their corresponding calibration models to determine which sensor outputs are most accurate. In the example of FIGS. 7A-7H, MR system 400 may use the selected outputs from the vertical sensors to measure blade flapping and the selected output from the horizontal sensors to measure blade lagging. In addition, a comparison of measurements from sensor arrays 420 and 430 may yield feathering measurements.

As stated throughout, sensors such as sensors 320 may be used to determine the location and position of blade 140 by determining the location and position of magnets 310. To do so, sensors such as sensors 320 may detect magnetic fields from magnets 310 and change their output voltages in response to the detected magnetic fields. Teachings of certain embodiments recognize the capability to measure the location and position of blade 140 based on the output voltages of each sensor 320.

Figure 8:
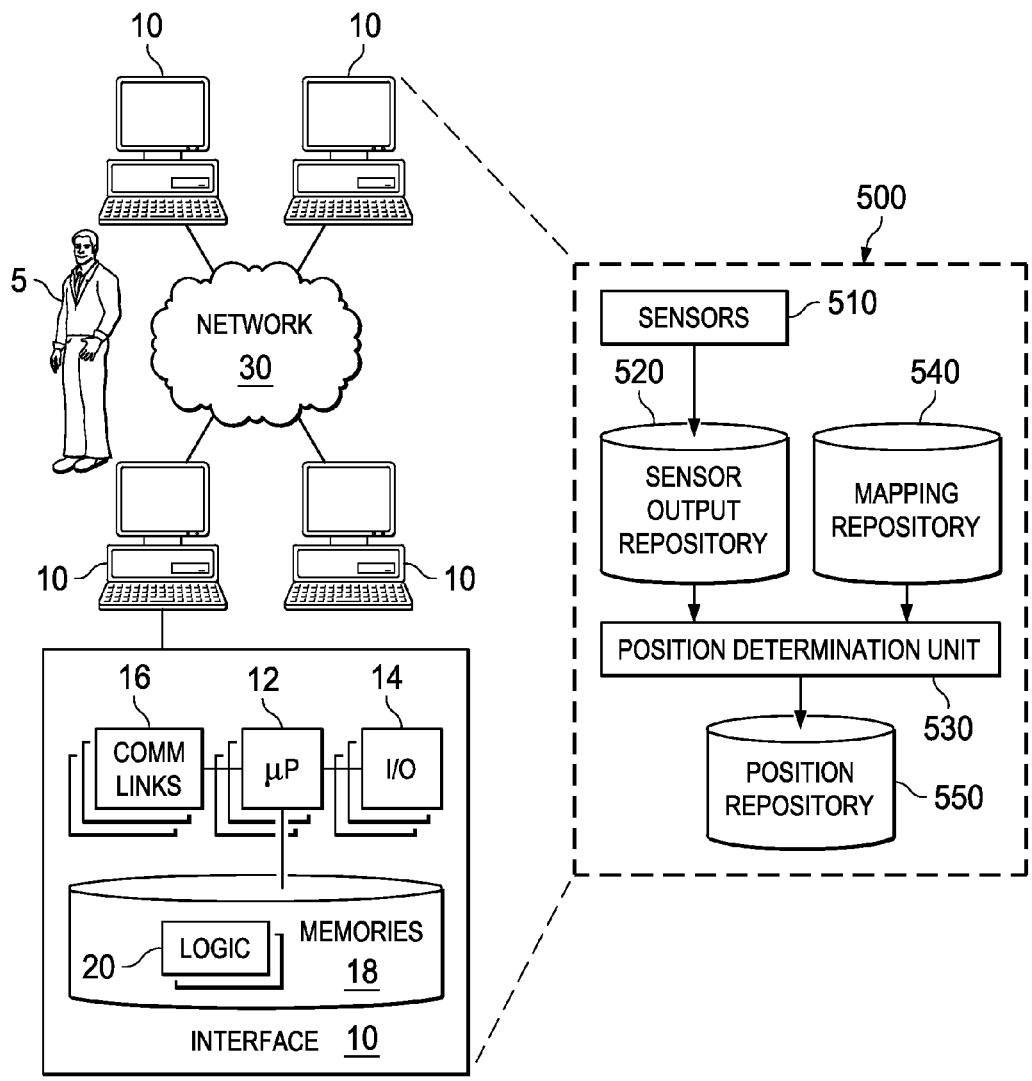
FIG. 8 shows a computerized position measurement system according to one example embodiment.

FIG. 8 shows a position measurement system 500 according to one embodiment. In general, system 500 features sensors 510, a sensor output repository 520, a position determination unit 530, a mapping repository 540, and a position repository 550, that may be implemented by one or more computer systems 10.

All, some, or none of the components of system 500 may be located on or near rotorcraft 100. For example, in one example embodiment, sensors 510 are incorporated into rotor system 200, sensor output repository 520 may be located elsewhere on fuselage 130, and position determination unit 530, mapping repository 540, and position repository 550 may be located remotely from rotorcraft 100.

Users 5 may access system 500 through computer systems 10. For example, in some embodiments, users 5 may access sensor output repository 520, mapping repository 540, and/or position repository 550 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Sensors 510 represent sensors that provide measurements representative of the location of a nearby magnet. In one example embodiment, sensors 510 are magneto-resistive sensors that provide measurements representative of an orientation of the magnetic flux received at the sensors. One example of sensors 510 may include, but are not limited to, sensors 320 and sensor arrays 420.

Sensor output repository 520 stores measurements received from sensors 510. If sensors 510 collect multiple measurements over time, sensor output repository 520 may store each set of measurements with a time stamp.

Position determination unit 530 determines a position of at least one magnet based on the measurements received from sensors 510. In some embodiments, position determination unite 530 may also determine a position of a rotor blade based on the position of the magnet.

In some embodiments, position determination unit 530 may determine the position of the magnet (or the rotor blade) based on inputs from multiple magneto-resistive sensors. In one example embodiment, position determination unit 530 receives a plurality of measurements from two or more magneto-resistive sensors 510 (e.g., two sensors within a sensor array 420/230). Position determination unit 530 analyzes the probable accuracy of each of the received plurality of measurements and selects the measurement having the highest probable accuracy. For example, the measurement having the highest probable accuracy may represent the measurement received from the sensor closest to the magnet (or closest to the linear flux region associated with the magnet). In some embodiments, the measurement having the highest probable accuracy may be identified using calibration models and curve fits such as described with regards to FIGS. 7C-7H. In some embodiments, selecting the measurement having the highest probable accuracy may include selecting multiple measurements having a high probability of accuracy. Position determination unit 530 may use the highest-probability measurement(s) to determine the position of the magnet.

In another example embodiment, position determination unit 530 receives a plurality of measurements from two pluralities of magneto-resistive sensors 510 (e.g., two sensors within a sensor array 420/230). For example, sensor array 420 includes a left-hand column of sensors 421v-425v and a right-hand column of sensors 421v-425v. In this example, the sensors of the left-hand and right-hand columns are aligned in two offset but substantially parallel directions, as seen in the example of FIG. 7B. In this example embodiment, position determination unit 530 analyzes the probable accuracy of each of the received plurality of measurements (from both the left-hand and right-hand columns of sensors) and selects the measurement(s) having the highest probable accuracy. Position determination unit 530 may use the highest-probability measurement(s) to determine the position of the magnet. Teachings of certain embodiments recognize that providing two (or more columns) of sensors within a sensor array such as sensor array 420 may increase the effective coverage area of the sensor array.

In some embodiments, position determination unit 530 may determine the position of the magnet (or the rotor blade) in multiple directions. In one example embodiments, position determination unit 530 receives a plurality of measurements from two pluralities of magneto-resistive sensors 510 (e.g., two sensors within a sensor array 420/230) aligned in different directions. For example, sensor array 420 includes a column of sensors 421v-425v and a column of sensors 421h-425h. In this example, the sensors of each column are aligned in different directions. For example, FIG. 7B shows sensors 421v-425v as being aligned vertically and sensors 421h-425h as being aligned horizontally. In this example embodiment, position determination unit 530 analyzes the probable accuracy of each of the received plurality of measurements (from both the vertically-aligned and horizontally-aligned columns of sensors) and selects the measurement(s) having the highest probable accuracy from each column. Position determination unit 530 may use the highest-probability measurements to determine the position of the magnet in both the horizontal and vertical directions. In some embodiments, determining the position of the magnet in both the horizontal and vertical directions may allow the position of the rotor blade to be determined in both the flapping and lead-lag directions, as described with regards to FIGS. 6A-6D.

In another example embodiment, position determination unit 530 receives a plurality of measurements from two pluralities of magneto-resistive sensors 510 (e.g., two sensors within a sensor array 420/230) that measure the magnetic flux of two different magnets. For example, sensor array 420 and sensor array 430 each include sensors that correspond to different magnets. In this example, the sensors of sensor array 420 and sensor array 430 may be offset from each other and be aligned in the same direction or in different directions. In this example embodiment, position determination unit 530 determines the location of the first magnet relative to sensor array 420 and determines the location of the second magnet relative to sensor array 430. In some embodiments, determining the position of both magnets may allow for feathering of the rotor blade to be determined, as described with regards to FIGS. 6A-6D.

In some embodiments, position determination unit 430 compares stored measurements from sensor output repository 520 to stored combinations from mapping repository 540. Mapping repository 540 stores a plurality of mapping records. Each mapping record includes one or more sensor measurements and a location (e.g., a magnet location or a rotor blade location) corresponding to those sensor measurements.

Mapping repository 540 may include multiple mapping records. For example, mapping repository 540 may include multiple mapping records identifying what the measurements from sensor array 420 would be if the magnet/sensors/blades were located at a variety of different positions.

Mapping repository 540 may be populated with mapping records in a variety of ways. In one example embodiment, blade 140 is moved in a variety of positions, and the measurements from sensors 510 are recorded at each position along with the location of the magnets relative to sensors 510.

In some embodiments, mapping repository 540 may be populated using a learning tool, such as an Artificial Neural Network (ANN) tool. An ANN may represent a mathematical model or computational model that is inspired by the structure and/or functional aspects of biological neural networks. An ANN may include of an interconnected group of artificial neurons and may process information using a connectionist approach to computation. In some cases, an ANN is an adaptive system that changes its structure based on external or internal information that flows through the network during the learning phase.

In some circumstances, an ANN may be configured for learning. In one example, given a specific task to solve, and a class of functions F, the ANN may learn by using a set of observations to find $f^* \epsilon F$, which may solve the task in some optimal sense.

The ANN tool may identify relationships between coordinated sensor outputs and positions. For example, the mapping repository 440 may be populated by arranging the magnets and sensors in a multitude of known positions, recording the sensor outputs at those positions, and then determining relationships between sensor outputs and positions such that positions may be calculated for new sensor outputs that do not exactly match the recorded sensor outputs. In some embodiments, the relationships may be represented by one or more equations that express all or some of the travel range of the magnets/sensors on one or more axis based on the recorded sensor outputs and their corresponding positions.

The ANN tool may capture complex relationships between previous sensor outputs and known positions such that the ANN tool can calculate the position for a new sensed topography based on these relationships. For example, in some circumstances, basic interpolation may not be practical with multiple sensors, but the ANN tool may determine the position for a new sensed topography based on the complex relationships between previous sensor outputs and known positions.

Position determination unit 530 may determine the location of the magnets/blades by comparing the stored measurements from sensor output repository 520 to one or more of the mapping records from mapping repository 540. In one example embodiment, position determination unit 530 identifies the mapping record having measurements closest to the stored measurements from sensor output repository 520 and then selects the location identified in the identified mapping record. In another example embodiment, position determination unit 530 selects multiple mapping records and then interpolates between them to identify a more accurate location for the stored measurements from sensor output repository 520. For example, position determination unit 530 may apply a curve fit to the mapping records and then compare the stored measurements from sensor output repository 520 to find the location corresponding to the stored measurements. In some embodiments, position determination unit 530 may use a learning tool, such as an ANN tool, to find the location corresponding to the stored measurements.

In one example embodiment, position determination unit 530 determines the location of the magnets relative to sensors 510 by filtering through mapping records of mapping repository 540. For example, by comparing the measurement from a sensor 510 to the mapping records, many of the mapping records may be eliminated from consideration as being too far away from the sensor 510.

In another example embodiment, position determination unit 530 determines the location of the magnets relative to sensors 510 by determining location one axis at a time. For example, position determination unit 530 may start by determining the flap position of the magnets (along the y-axis of coordinate system 330). Next, position determination unit 530 may determine the feathering position of the magnets. Position determination unit 530 may then determine the lag position of the magnets (along the x-axis of coordinate system 330). Teachings of certain embodiments recognize that determining location one axis at a time may provide for more accurate results. For example, determining flap position first may reduce the number of possible feathering positions, which may in turn allow for a more accurate determination of the feathering position.

In this example embodiment, position determination unit 530 may determine the location of the magnets relative to sensors 510 using an ANN tool. In this example, the ANN tool may not be capable of accurately expressing the position measurement over the entire range in a single equation. Accordingly, teachings of certain embodiments recognize the capability to break the travel range down into smaller region, each with its own ANN equation. The determination of which equation to use may depend on the determined position along certain axes. Returning to the previous example, position determination unit 530 may start by determining the flap position (along the y-axis of coordinate system 330) in an effort to determine which equation to use to determine the feathering position, and so on.

Thus, teachings of certain embodiments recognize the capability of position determination unit 530 to determine a location based on signals from sensors 510. Position determination unit 530 may also determine the location of blade 140. In one example, position determination unit 530 determines the location of the magnets relative to sensors 510 and then maps this location to a corresponding location of blade 140. In another example embodiment, the mapping records stored by mapping repository 540 map measurements to corresponding locations of blade 140. In this second example, position determination unit 530 may determine a location of the magnets, a location of blade 140, or both locations. In some embodiments, position determination system 300 is coupled relative to blade 140 such that a known relationship exists between the location of blade 140 and the location of the magnets relative to sensors 510.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
    a body;
    a power train coupled to the body and comprising a power source and a drive shaft coupled to the power source;
    a hub coupled to the drive shaft;
    a rotor blade;
    a grip coupling the rotor blade to the hub; and
    a position determination system disposed between the blade and the body, the position determination system comprising:
        at least one magnet; and
        a plurality of magneto-resistive sensors proximate to the at least one magnet;
        wherein the at least one magnet is movable relative to the plurality of magneto-resistive sensors as a function of movement of the grip relative to the hub.

2. The rotorcraft of claim 1, wherein the plurality of magneto-resistive sensors comprises two or more magneto-resistive sensors, the rotorcraft further comprising:
    a position determining unit in communication with the plurality of magneto-resistive sensors, the position determining unit configured to:
        receive a plurality of measurements from the two or more magneto-resistive sensors;
        analyze a probable accuracy of each of the received plurality of measurements;
        select the measurement of the received plurality of measurements having the highest probable accuracy; and
        determine a position of the at least one magnet based at least in part on the selected measurement.

3. The rotorcraft of claim 1, wherein the position determination system is disposed between the blade and at least part of a hub, wherein a grip couples the rotor blade to the hub.

4. The rotorcraft of claim 1, wherein the position determination system is disposed between a rotor system and a rotor mast.

5. The rotorcraft of claim 1, further comprising a position determining unit in communication with the plurality of magneto-resistive sensors, the position determining unit configured to:
receive a plurality of measurements from the plurality of magneto-resistive sensors, the plurality of measurements representative of an orientation of a flux received at each of the plurality of magneto-resistive sensors; and
determine a position of the at least one magnet based on the received plurality of measurements.

6. The rotorcraft of claim 5, the position determining unit further operable to determine a position of the rotor blade based on the position of the at least one magnet.

7. The rotorcraft of claim 1, wherein the plurality of magneto-resistive sensors comprises a first plurality of magneto-resistive sensors comprising sensors substantially aligned along a first direction and a second plurality of magneto-resistive sensors comprising sensors aligned along a second direction.

8. The rotorcraft of claim 7, wherein the second direction is different than the first direction, the rotorcraft further comprising a position determining unit in communication with the plurality of magneto-resistive sensors, the position determining unit configured to:
receive a first plurality of measurements from the first plurality of magneto-resistive sensors and a second plurality of measurements from the second plurality of magneto-resistive sensors;
determine a position of the at least one magnet in the first direction based on the received first plurality of measurements; and
determine a position of the at least one magnet in the second direction based on the received second plurality of measurements.

9. The rotorcraft of claim 7, wherein the second direction is substantially parallel to the first direction, the rotorcraft further comprising a position determining unit in communication with the plurality of magneto-resistive sensors, the position determining unit configured to:
receive a first plurality of measurements from the first plurality of magneto-resistive sensors and a second plurality of measurements from the second plurality of magneto-resistive sensors;
analyze a probable accuracy of each of the received first and second plurality of measurements;
select the measurement of the received first and second plurality of measurements having the highest probable accuracy; and
determine a position of the at least one magnet based at least in part on the selected measurement.

10. The rotorcraft of claim 7, wherein:
the position determination system comprises at least two magnets comprising a first magnet and a second magnet;
the first plurality of magneto-resistive sensors is proximate to the first magnet; and
the second plurality of magneto-resistive sensors is proximate to the second magnet.

11. The rotorcraft of claim 10, the position determining unit further operable to determine a feathering position of the rotor blade based on the relative positions of the first and second magnet.

12. A method for determining a position of a rotor blade, comprising:
receiving a plurality of measurements from a plurality of magneto-resistive sensors, the plurality of magneto-resistive sensors being proximate to at least one magnet, wherein one of the plurality of magneto-resistive sensors and the at least one magnet moves with a rotor blade connected to a hub by a grip; and
determining a position of the at least one magnet based on the received plurality of measurements;
wherein the at least one magnet is movable relative to the plurality of magneto-resistive sensors as a function of movement of the grip relative to the hub.

13. The method of claim 12, wherein the plurality of measurements are representative of an orientation of a flux received at each of the plurality of magneto-resistive sensors.

14. The method of claim 12, further comprising determining a position of the rotor blade based on the position of the at least one magnet.

15. The method of claim 12, wherein:
the plurality of magneto-resistive sensors comprises two or more magneto-resistive sensors; and
receiving the plurality of measurements comprises:
receive a plurality of measurements from the two or more magneto-resistive sensors;
analyze a probable accuracy of each of the received plurality of measurements;
select the measurement of the received plurality of measurements having the highest probable accuracy; and
determine a position of the at least one magnet based at least in part on the selected measurement.

16. The method of claim 12, wherein the plurality of magneto-resistive sensors comprises a first plurality of magneto-resistive sensors substantially aligned along a first direction and a second plurality of magneto-resistive sensors aligned along a second direction.

17. The method of claim 16, wherein:
the second direction is different than the first direction;
receiving the plurality of measurements comprises receiving a first plurality of measurements from the first plurality of magneto-resistive sensors and a second plurality of measurements from the second plurality of magneto-resistive sensors; and
determining the position of the at least one magnet comprises:
determining a position of the at least one magnet in the first direction based on the received first plurality of measurements; and
determining a position of the at least one magnet in the second direction based on the received second plurality of measurements.

18. The method of claim 16, wherein:
the second direction is substantially parallel to the first direction;
receiving the plurality of measurements comprises receiving a first plurality of measurements from the first plurality of magneto-resistive sensors and a second plurality of measurements from the second plurality of magneto-resistive sensors; and
determining the position of the at least one magnet comprises:

analyzing a probable accuracy of each of the received first and second plurality of measurements;

selecting the measurement of the received first and second plurality of measurements having the highest probable accuracy; and determining a position of the at least one magnet based at least in part on the selected measurement.

19. The method of claim 16, wherein:

the position determination system comprises at least two magnets comprising a first magnet and a second magnet;

the first plurality of magneto-resistive sensors is proximate to the first magnet;

the second plurality of magneto-resistive sensors is proximate to the second magnet; and determining the position of the at least one magnet comprises:

determining a position of the first magnet based on the received first plurality of measurements; and determining a position of the second magnet based on the received second plurality of measurements.

20. The method of claim 19, further comprising determining a feathering position of a rotor blade based on the relative positions of the first and second magnet.

\* \* \* \* \*